US009528397B2

(12) United States Patent
Berruet et al.

(10) Patent No.: US 9,528,397 B2
(45) Date of Patent: Dec. 27, 2016

(54) MECHANICAL SYSTEM FORMING A CAM FOLLOWER OR A ROCKER ARM AND METHOD FOR MANUFACTURING SUCH A MECHANICAL SYSTEM

(71) Applicants: Nicolas Berruet, Artannes sur Indre (FR); François Champalou, Chaumont-sur-Loire (FR); Benoît Hauvespre, Saint Etienne de Chigny (FR); Guillaume Jouanno, Plouha (FR); Samuel Viault, Saint-Antoine-du-Rocher (FR)

(72) Inventors: Nicolas Berruet, Artannes sur Indre (FR); François Champalou, Chaumont-sur-Loire (FR); Benoît Hauvespre, Saint Etienne de Chigny (FR); Guillaume Jouanno, Plouha (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/945,930

(22) Filed: Nov. 19, 2015

(65) Prior Publication Data

US 2016/0153322 A1    Jun. 2, 2016

(30) Foreign Application Priority Data

Nov. 27, 2014   (EP) .................................... 14306907

(51) Int. Cl.
*F16H 53/06* (2006.01)
*F01L 1/18* (2006.01)
(Continued)

(52) U.S. Cl.
CPC .. *F01L 1/18* (2013.01); *F01L 1/14* (2013.01); *F02M 59/102* (2013.01); *F16H 53/06* (2013.01);
(Continued)

(58) Field of Classification Search
CPC ................ F01L 1/14; F01L 1/143; F01L 1/16; F01L 1/18; F01L 2105/02; F02M 59/102; F02M 2200/8053; F16H 53/00; F16H 53/06
See application file for complete search history.

(56) References Cited

U.S. PATENT DOCUMENTS 4,204,814 A * 5/1980 Matzen ................ F02M 59/102
 417/437
4,335,685 A  6/1982 Clouse
(Continued)

FOREIGN PATENT DOCUMENTS

DE           3247026 A1 *  6/1984 ................ F01L 1/14
DE    102011076022 A1 * 11/2012 ........... F02M 59/102
(Continued)

OTHER PUBLICATIONS

Machine translation of DE 3247026 A1 obtained on May 11, 2016.*

*Primary Examiner* — Adam D Rogers
(74) *Attorney, Agent, or Firm* — Bryan Peckjian; SKF USA Inc. Patent Dept.

(57) ABSTRACT

A mechanical system forming a cam follower or a rocker arm; the mechanical system including a support element, a pin extending between two opposite ends along a first axis and supported by the support element, and a roller mounted on the pin, movable in rotation relative to the pin around the first axis and adapted to roll on a cam. The mechanical system further includes an insert made from separate parts and including holding members supporting the pin ends.

15 Claims, 2 Drawing Sheets

(51) Int. Cl.
*F02M 59/10* (2006.01)
*F01L 1/14* (2006.01)

(52) U.S. Cl.
CPC ... *F01L 2105/02* (2013.01); *F02M 2200/8053* (2013.01)

(56) References Cited

U.S. PATENT DOCUMENTS

| | | | |
|---|---|---|---|
| 6,302,075 | B1 | 10/2001 | Krieg et al. |
| 7,793,583 | B2 * | 9/2010 | Radinger ............... F01L 1/143 74/569 |
| 8,863,716 | B2 * | 10/2014 | Dorn ....................... F01L 1/14 123/90.5 |
| 2006/0078243 | A1 * | 4/2006 | Ochi ...................... F01L 1/146 384/449 |
| 2008/0190237 | A1 | 8/2008 | Radinger et al. |
| 2013/0213181 | A1 | 8/2013 | Dorn et al. |
| 2014/0150602 | A1 | 6/2014 | Hauvespre et al. |
| 2015/0082938 | A1 * | 3/2015 | Schick ..................... F01L 1/14 74/569 |
| 2016/0091074 | A1 * | 3/2016 | Berruet .................. F16H 53/06 74/569 |

FOREIGN PATENT DOCUMENTS

| | | |
|---|---|---|
| DE | 102012221604 A1 | 5/2014 |
| EP | 2607636 A1 | 6/2013 |
| NL | 7801628 A | 9/1978 |
| WO | 13119214 A1 | 8/2013 |

\* cited by examiner

MECHANICAL SYSTEM FORMING A CAM FOLLOWER OR A ROCKER ARM AND METHOD FOR MANUFACTURING SUCH A MECHANICAL SYSTEM

CROSS REFERENCE TO RELATED APPLICATIONS

This is a Non-Provisional patent application, filed under the Paris Convention, claiming the benefit of Europe (EP) Patent Application Number 14306907.8, filed on 27 Nov. 2014, which is incorporated herein by reference in its entirety.

TECHNICAL FIELD OF THE INVENTION

The invention concerns a mechanical system, forming a cam follower or a rocker arm, and comprising a pin or a roller. The invention also concerns an injection pump or a valve actuator comprising such a mechanical system. Finally, the invention also concerns a method for manufacturing such a mechanical system.

BACKGROUND OF THE INVENTION

Classically, a cam follower comprises at least a tappet, a pin and a roller. The tappet extends along a longitudinal axis, while the pin and the roller are centered on a transversal axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis in a bore belonging to the injection pump, with the cylindrical outer surface of the tappet sliding in this bore. The roller is movable in rotation around its central axis. The body of the tappet is in one piece, made by forging.

As shown by example in EP-A-2 607 636, it is known to provide the tappet with a single piece body equipped with two flanges having holes for supporting the ends of the pin on which the roller is mounted. The holes in the flanges each have a radial recess adapted to receive a plastically deformed radial portion of the caulked end of the pin. For assembling the cam follower, the roller is mounted between the flanges of the tappet. Then, the pin is inserted in the roller, through the holes of the flanges, the ends of the pin being supported by the flanges. Then, the ends of the pin are caulked. The assembly of the tappet is time consuming. Besides, the body of the tappet has to be machined, which is long and expensive.

SUMMARY OF THE INVENTION

The aim of the invention is to provide an improved mechanical system easy to assemble and having a reduced cost.

To this end, the invention concerns a mechanical system forming a cam follower or a rocker arm, the mechanical system comprising a support element, a pin extending between two opposite ends along a first axis and supported by the support element, and a roller mounted on the pin, movable in rotation relative to the pin around the first axis and adapted to roll on a cam. According to the invention, the mechanical system further includes an insert made from three separate parts including holding members, generally parallel with a longitudinal axis of mechanical system, the longitudinal axis being perpendicular to the first axis, whereas the holding members support the pin ends, and a connecting portion perpendicular to the holding members.

Thanks to the invention, the insert allows to easily mount the pin. The mechanical member is cheaper to produce.

According to further aspects of the invention which are advantageous but not compulsory, such a mechanical system may incorporate one or several of the following features:

- Each holding member includes several legs protruding towards a lower end of tappet, each leg being fitted into a corresponding notch of connecting portion.
- Each holding member has a blind cylindrical recess having a diameter roughly equal to the diameter of pin ends, with pin ends engaged inside blind cylindrical recesses.
- First axial abutment feature block the translation of the insert along a first direction parallel to longitudinal axis.
- The first axial abutment feature protrudes outside a cavity delimited by the support element and receiving the pin.
- The mechanical system includes second abutment feature blocking the translation of the pin assembly and of the insert, in a second direction opposite the first direction.
- The second abutment feature includes protrusions made by stamping a cylindrical wall of support element.
- The support element comprises a cylindrical wall extending around the pin and blocking the translation of the pin along the first axis.
- Pin ends extend on one side and another of a first part of the pin, with a shoulder perpendicular to a transversal axis located between the first part and each pin end.
- A first axial clearance parallel to the first axis is defined between each pin end and a bottom of the corresponding recess, and a second axial clearance parallel to the first axis is defined between each shoulder and an internal surface of the corresponding holding member.
- A radial clearance is located between each pin end and the corresponding recess.

Another aspect of the invention concerns an injection pump for a motor vehicle, comprising a mechanical system according to the invention.

Another aspect of the invention concerns a valve actuator for a motor vehicle, comprising a mechanical system according to the invention.

Another aspect of the invention concerns a method for manufacturing a mechanical system according to the invention, wherein:

- the pin and the roller are assembled together,
- the holding members of the insert are assembled with the pin, with each pin end inside a recess,
- the insert, the pin and the roller are inserted inside the support element.

Advantageously, the insert, the pin and the roller are inserted inside the support element until the insert comes into abutment with first abutment feature.

The method may further include a subsequent step wherein second abutment feature are made by stamping a cylindrical wall of support element, for blocking the translation of insert in a direction parallel to the longitudinal axis.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

Figure 1:
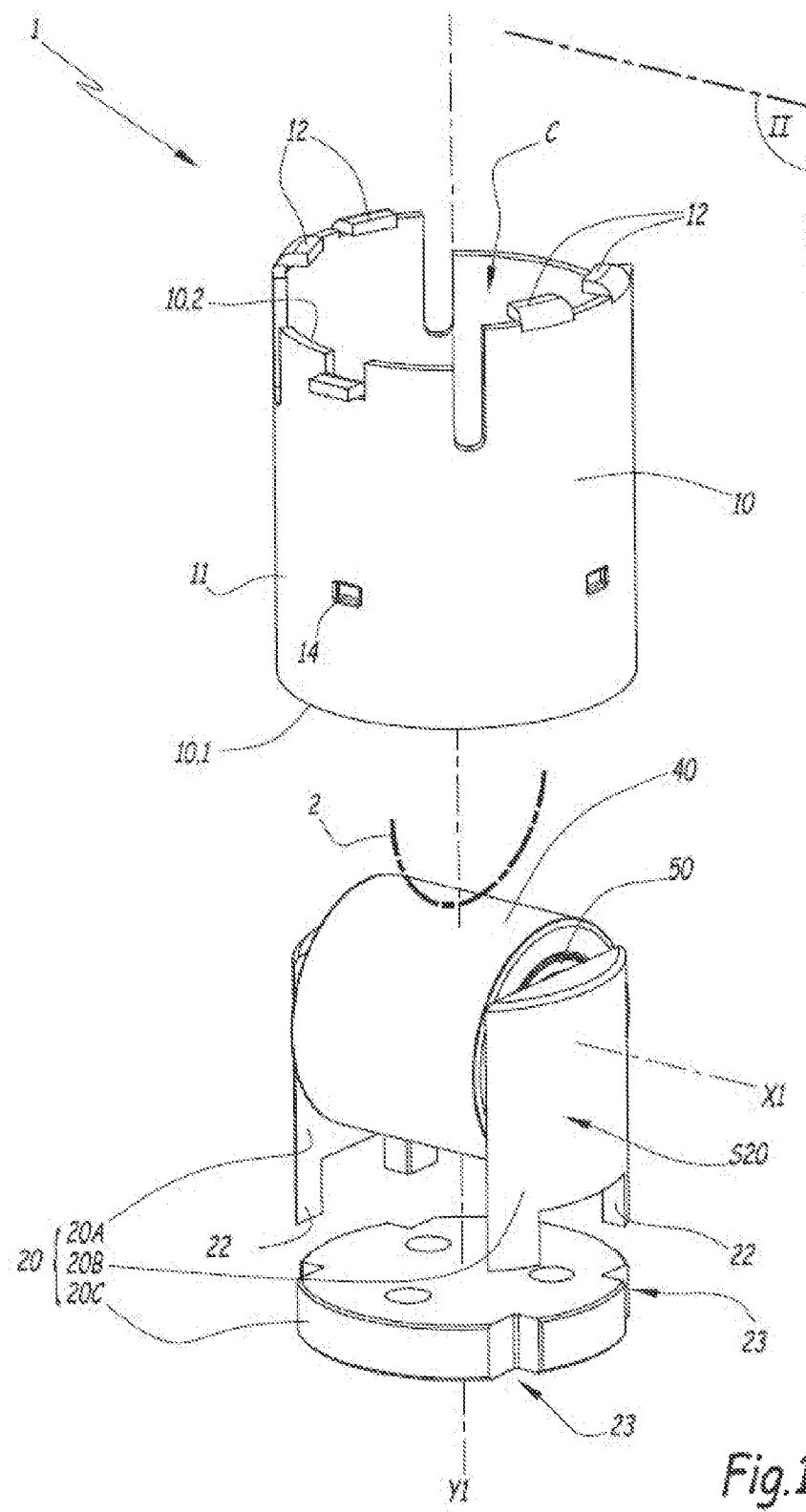
FIG. 1 is an exploded perspective view of a mechanical system according to the invention.
Figure 2:
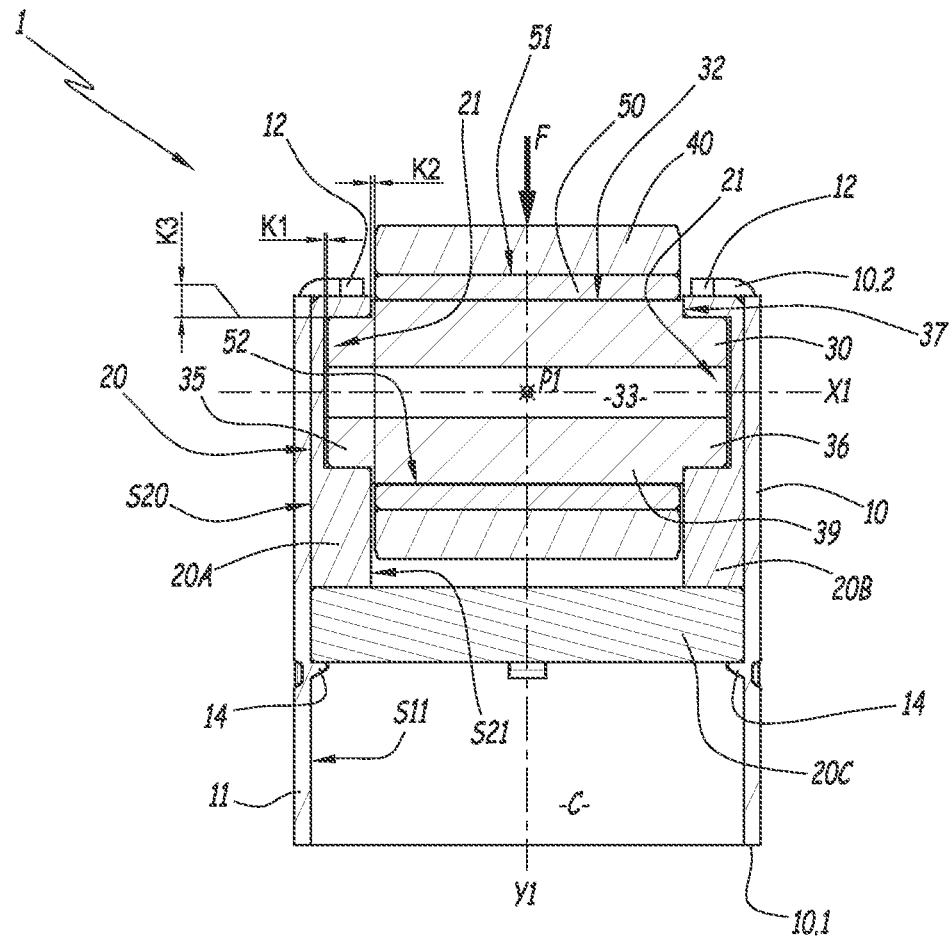
FIG. 2 is a sectional view along plane II on FIG. 1.

The mechanical system 1 represented on FIGS. 1 and 2 is of the cam follower type, adapted to equip an injection pump for a motor vehicle, not shown.

Mechanical system 1 comprises a support element or tappet 10, an insert 20, a pin 30 and a roller 40, together forming a plain bearing. In heavy duty applications such as in diesel truck engines, there is a lack of space for the implementation of a rolling bearing, thus justifying the use of a plain bearing between parts 30 and 40. Pin 30 and roller 40 are centered on a transversal axis X1, while tappet 10 is centered on a longitudinal axis Y1 of mechanical system 1. Axes X1 and Y1 are perpendicular and they have a point of intersection P1. Roller 40 is adapted to roll on a cam 2, partly shown on FIG. 1 only, in centerline. More precisely, an external surface 41 of roller 40 can roll on the outer surface of cam 2. When cam 2 and roller 40 are cooperating, a force F is applied on surface 41 along longitudinal axis Y1.

A cavity C is delimited inside tappet 10. This cavity C is adapted to receive a shaft or plunger, not shown, for moving tappet 10 along axis Y1. Tappet 10 is movable back and forth along axis Y1, in a non-represented bore belonging to the injection pump.

Tappet 10 has a cylindrical wall or skirt 11 centered along longitudinal axis Y1, with a first end or lower end 10.1, on the side of plunger, and a second end or upper end 10.2 on the side of pin 30 and roller 40. An internal surface S11 of cylindrical wall 11 delimits cavity C.

Insert 20 is made of three separate pieces and includes a first holding portion 20A and a second holding portion 20B generally parallel with longitudinal axis Y1, and a connecting portion 20C perpendicular to holding portions 20A and 20B. Holding portions 20A and 20B are also named holding members 20A and 20B throughout the present document.

Each holding portion 20A and 20B is provided with a blind circular recess 21 for receiving one end 35 or 36 of pin 30. Recesses 21 are centered on transversal axis X1 and have a diameter slightly higher than to the diameter of pin ends 35 and 36. Holding portions 20A and 20B have a convex external surface S20 curved like a portion of cylinder having a diameter roughly equal to the diameter of an internal surface S11 of tappet 10.

Pin ends 35, 36 extend on one side and another of a first part 39 of pin 30, this part having a diameter higher than the diameter of pin ends 35 and 36. Thus, a shoulder 37 perpendicular to transversal axis X1 is located between first part 39 and each pin end 35 and 36.

There is a first axial clearance K1 between each pin end 35 and 36 and the bottom of the corresponding recess 21. There is a second axial clearance K2 between each shoulder 37 and an internal surface S21 of the corresponding holding member 20A or 20B, into which recesses 21 are excavated. Axial clearances K1 and K2 are parallel to transversal axis X1.

There is a radial clearance K3 between each pin end 35 and 36 and the cylindrical wall of each recess 21, measured radially with respect to transversal axis X1

Connecting portion 20C is a flat disc perpendicular to longitudinal axis Y1, having a diameter roughly equal to the diameter of internal surface S11 of tappet 10.

Each holding portion 20A and 20B includes several legs 22 protruding towards lower end 10.1 of tappet 10, for example two legs. Each leg 22 is fitted into a corresponding notch 23 of connecting portion 20C.

Connecting portion 20C is made from a metallic sheet, or by metal sintering. It transmits the load F to the plunger. Holding members 20A and 20B are made in metal, by forging or sintering. It is also possible to have holding members 20A and 20B made from a synthetic material overmolded with connecting portion 20C.

Tappet 10 is made from a metallic sheet, or from a metallic tube.

Roller 40 has an internal cylindrical bore 42, centred on transversal axis X1. Pin 30 comprises a cylindrical outer surface 32 extending between pin ends 35 and 36, and an internal through-hole 33, both centered on transversal axis X1. Surface 32 is adjusted with bore 42 of roller 40, such that roller 40 is movable in rotation relative to pin 30 around axis X1. Both pin 30 and roller 40 axes merge with transversal axis X1.

A bushing 50 is located at the interface between pin 30 and roller 40. Bushing 50 has an outer cylindrical surface 51 and an inner cylindrical bore 52. During assembly of system 1, surface 51 of bushing 50 is adjusted with bore 42 of roller 40, while surface 32 of pin 30 is adjusted with bore 52 of bushing 50, such that roller 40 is movable in rotation relative to pin 30 around axis X1. Pin 30, roller 40 and bushing 50 axes merge with axis X1.

Tappet 10 is equipped with tabs 12 protruding from upper end 10.2, forming first axial abutment feature. Tabs 12 are external with respect to cavity C. Each holding portion 20A or 20B, thus each pin end 35 and 36, is blocked by two tabs 12. For example, tabs 12 are made by bending a portion of tappet 10.

Tappet 10 and insert 20 together form a support element for pin 30 and roller 40. Insert 20, pin 30, roller 40 and bushing 50 form a pin assembly.

For manufacturing mechanical member 1, roller 40 and bushing 50 are fitted around pin 30.

Then, holding members 20A and 20B of insert 20 are assembled with pin 30, with pin ends 35 and 36 engaged inside recesses 21.

Then, legs 22 of holding members 20A and 20B are fitted inside notches 23 of connecting portion 20C.

Then, a pin assembly formed by parts 20, 30, 40, 50 is inserted in one step inside tappet 10 until it comes into abutment with tabs 12 of tappet 10, with a slight press-fit Then, protrusions 14 are made by stamping. In a variant, protrusions 14 are replaced by elastic clips.

In a first direction from lower end 10.1 of tappet 10 towards upper end 10.2, the translation of pin assembly along longitudinal axis Y1 is blocked by tabs 12.

In a second direction opposite the first direction, from upper end 10.2 of tappet 10 towards lower end 10.1, the translation of pin assembly along longitudinal axis Y1 is stopped by a second axial abutment formed by protrusions 14 protruding inside cavity C.

The cylindrical wall or skirt 11 of tappet 10 extends around pin 30 and forms retaining feature for blocking the translation of pin 30 along transversal axis X1.

The pin assembly 20, 30, 40, 50 is easy to assemble. The time for development of the process is short. The investment is cheaper than with known mechanical systems, there is no need to spend time to develop a complicated caulking process.

It is possible to have a range of mechanical elements 1 with pin assemblies having different heights. Theses pin assemblies can be mounted in a single reference of tappet 10, by adjusting the position of the protrusions 14.

In another embodiment, the legs 22 and the notches 23 of insert 20 are suppressed. No press-fitting or any interconnection between holding members 20A and 20B and connecting element 20C is required.

In a non-depicted variant, bushing 50 is eliminated or replaced by another type of bearing or sliding element, such as needle roller bearings with plastic cage, used for injection pumps for gasoline engines.

Other non-show embodiments can be implemented within the scope of the invention. For example, support element 10 may have a different configuration depending on the intended application of system 1.

Moreover, the mechanical system 1 according to the invention is not limited to a cam follower. For example, system 1 may form a rocker arm, wherein the support element 10 is an arm movable in rotation along a pivot axis parallel to axis X1.

In addition, technical features of the different embodiments can be, in whole or part, combined with each other. Thus, mechanical systems can be adapted to the specific requirements of the application.

What is claimed is:

1. A mechanical system forming one of a cam follower or a rocker arm, the mechanical system comprising:
    a support element;
    a pin extending between two opposite ends along a first axis and supported by the support element;
    a roller mounted on the pin, movable in rotation relative to the pin around the first axis and having a rolling surface adapted to roll on a cam; and
    an insert made from three separate parts including:
        holding members, being parallel with a longitudinal axis of the mechanical system, the longitudinal axis being perpendicular to the first axis, wherein each holding member supports one of the two opposite ends of the pin, and
        a connecting portion perpendicular to the holding members,
        wherein the rolling surface of the roller does not contact the connecting portion during operation;
    and wherein the support element comprises tabs that extend toward the longitudinal axis from a support element outer surface, each of the tabs abut one of the holding members such that the tabs prevent the holding members and the roller from moving with respect to the support element along the longitudinal axis.

2. The mechanical system according to claim 1, each holding member further comprising two blind cylindrical recesses each having a diameter equal to a diameter of the pin ends,
    wherein each pin end is engaged inside one of the two blind cylindrical recesses.

3. The mechanical system according to claim 1, wherein a first axial abutment feature is comprised of tabs that block the translation of the insert along a first direction parallel to the longitudinal axis.

4. The mechanical system according to claim 3, wherein the tabs extend outside a cavity delimited by the support element and receiving the pin.

5. The mechanical system according to claim 3, further comprising a second abutment feature blocking the translation of the pin and of the insert, in a second direction opposite the first direction.

6. The mechanical system according to claim 5, the second abutment feature further comprising protrusions made by stamping a cylindrical wall of the support element.

7. The mechanical system according to claim 1, the support element further comprising a cylindrical wall extending around the pin and blocking translation of the pin along the first axis.

8. The mechanical system according to claim 1, wherein a first part of the pin extends between the pin ends, wherein a first part diameter is greater than a pin end diameter and, a shoulder extends between the first part and each pin end.

9. The mechanical system according to claim 8, further comprising:
    a first axial clearance parallel to the first axis, wherein the first axial clearance is defined between each pin end and a bottom of a corresponding recess of the holding members, and
    a second axial clearance parallel to the first axis, wherein the second axial clearance is defined between each shoulder and an internal surface of a corresponding holding member.

10. The mechanical system according to claim 1, further comprising a radial clearance between each pin end and a corresponding recess.

11. The mechanical system according to claim 1, wherein the mechanical system is integrated into a valve actuator for a motor vehicle.

12. A mechanical system forming one of a cam follower or a rocker arm, the mechanical system comprising:
    a support element;
    a pin extending between two opposite ends along a first axis and supported by the support element;
    a roller mounted on the pin, movable in rotation relative to the pin around the first axis and adapted to roll on a cam; and
    an insert made from three separate parts including:
        holding members, being parallel with a longitudinal axis of the mechanical system, the longitudinal axis being perpendicular to the first axis, wherein each holding member supports one of the two opposite ends of the pin, each holding member further comprising at least two legs protruding towards a lower end of the support element, and
        a connecting portion perpendicular to the holding members, wherein each of the at least two legs of each of the holding members is fitted into a corresponding notch of the connecting portion.

13. A method for manufacturing a mechanical system, the mechanical system comprising:
    a support element;
    a pin extending between two opposite ends along a first axis and supported by the support element; and
    a roller mounted on the pin, movable in rotation relative to the pin around the first axis and adapted to roll on a cam; and
    an insert made from three separate parts including:
        holding members, being parallel with a longitudinal axis of the mechanical system, the longitudinal axis being perpendicular to the first axis, whereas the holding members support the pin ends, each holding member further comprising at least two legs protruding towards a lower end of the support element, and
a connecting portion perpendicular to the holding members, wherein each of the at least two legs of each of the holding members is fitted into a corresponding notch of the connecting portion, the method comprising steps of:
assembling the pin and the roller together;
assembling the holding members of the insert with the pin, with each pin end inside a recess; and
inserting the insert, the pin and the roller inside the support element.

14. The method according to claim 13, wherein the step of inserting the insert, the pin and the roller inside the support element is accomplished by inserting the insert, the pin and the roller inside the support element until the insert comes into abutment with a first abutment feature.

15. The method according to claim 14, further comprising a subsequent step of:
manufacturing a second abutment feature by stamping a cylindrical wall of the support element, for blocking the translation of the insert in a direction parallel to the longitudinal axis.

* * * * *